(12) United States Patent
Vandeven et al.

(10) Patent No.: US 10,945,370 B2
(45) Date of Patent: Mar. 16, 2021

(54) SYSTEM AND METHOD FOR GROUND FOLLOWING OF A COMBINE HEADER WITH FLEXIBLE CUTTER BAR

(71) Applicant: Deere & Company, Moline, IL (US)

(72) Inventors: Michael L. Vandeven, Princeton, IA (US); Alex Brimeyer, Bettendorf, IA (US); Duane M. Bomleny, Geneseo, IL (US); Bryan R. Yanke, Eldridge, IA (US); Adam L. Heeren, Taylor Ridge, IL (US); Joshua R. Pierson, Davenport, IA (US)

(73) Assignee: DEERE & COMPANY, Moline, IL (US)

( * ) Notice: Subject to any disclaimer, the term of this patent is extended or adjusted under 35 U.S.C. 154(b) by 82 days.

(21) Appl. No.: 15/998,715

(22) Filed: Aug. 16, 2018

(65) Prior Publication Data

US 2020/0053963 A1   Feb. 20, 2020

(51) Int. Cl.
*A01D 41/14* (2006.01)
*A01D 57/20* (2006.01)

(52) U.S. Cl.
CPC ............. *A01D 41/14* (2013.01); *A01D 57/20* (2013.01)

(58) Field of Classification Search
CPC ........ A01D 41/14; A01D 57/20; A01D 41/16; A01D 41/145; A01D 41/141; A01D 41/144; A01D 47/00; A01D 34/283
See application file for complete search history.

(56) References Cited

U.S. PATENT DOCUMENTS

| | | | | |
|---|---|---|---|---|
| 2,438,065 A | * | 3/1948 | Love ................... | A01D 57/20 56/303 |
| 2,807,127 A | * | 9/1957 | Scheidenhelm ....... | A01D 57/20 56/15.7 |

(Continued)

FOREIGN PATENT DOCUMENTS

| | | |
|---|---|---|
| BR | PI0702615 A | 2/2008 |
| EP | 1721509 A2 | 11/2006 |

OTHER PUBLICATIONS

U.S. Appl. No. 15/499,952, filed Apr. 28, 2017, by Vandeven et al.

(Continued)

*Primary Examiner* — Arpad Fabian-Kovacs
(74) *Attorney, Agent, or Firm* — Michael Best & Friedrich LLP

(57) ABSTRACT

A harvesting head for a combine and method of operating. An attachment frame at an aft end of the head attaches with a combine feederhouse. A main frame of the head is movably connected to the attachment frame, and the main frame has a range of travel with respect to the attachment frame. A resilient float element is provided between the attachment and main frames. A flexible cutterbar on the main frame operates to cut crops. The cutterbar is supported on the main frame by a plurality of pivoting arms distributed across a width of the head. With the main frame in a nominal intermediate position within the range of travel, the plurality of pivoting arms have 10 percent or less of total available travel as upward travel and at least 90 percent of total available travel as downward travel when the head is set in the nominal position.

16 Claims, 12 Drawing Sheets

(56) References Cited

U.S. PATENT DOCUMENTS

| | | | | |
|---|---|---|---|---|
| 3,982,383 | A * | 9/1976 | Mott | A01D 34/30 56/11.6 |
| 4,206,583 | A * | 6/1980 | Week | A01D 41/14 56/15.8 |
| 4,206,584 | A * | 6/1980 | Johnson | A01D 41/14 56/15.8 |
| 4,332,126 | A * | 6/1982 | Van Auwelaer | A01D 41/141 56/10.2 R |
| 4,441,307 | A * | 4/1984 | Enzmann | A01D 41/14 56/10.2 R |
| 4,573,308 | A * | 3/1986 | Ehrecke | A01D 41/14 56/14.4 |
| 4,599,852 | A * | 7/1986 | Kerber | A01D 41/14 56/15.8 |
| 4,665,685 | A * | 5/1987 | Rupprecht | A01D 41/14 56/15.8 |
| 4,776,153 | A * | 10/1988 | DePauw | A01D 41/145 56/10.2 E |
| 6,675,568 | B2 * | 1/2004 | Patterson | A01D 41/14 56/208 |
| 6,782,683 | B2 * | 8/2004 | Buermann | A01D 41/14 56/257 |
| 7,836,671 | B2 | 11/2010 | Sauerwein et al. | |
| 7,930,871 | B1 * | 4/2011 | Figgins | A01D 41/141 56/208 |
| 7,937,920 | B2 | 5/2011 | Schmidt et al. | |
| 7,950,212 | B1 * | 5/2011 | Figgins | A01D 41/14 56/181 |
| 8,601,779 | B1 * | 12/2013 | Figgins | A01D 34/283 56/181 |
| 9,148,999 | B2 * | 10/2015 | Fuechtling | A01D 41/14 |
| 10,299,434 | B2 * | 5/2019 | Yanke | A01D 57/04 |
| 10,462,968 | B2 * | 11/2019 | Shearer | A01D 41/145 |
| 10,582,660 | B2 * | 3/2020 | Yanke | A01D 41/141 |
| 10,624,260 | B2 * | 4/2020 | Shearer | A01D 34/283 |
| 2003/0074876 | A1 | 4/2003 | Patterson et al. | |
| 2007/0193243 | A1 * | 8/2007 | Schmidt | A01D 57/20 56/181 |
| 2008/0072560 | A1 | 3/2008 | Talbot | |
| 2008/0276590 | A1 * | 11/2008 | Sauerwein | A01D 41/14 56/153 |
| 2009/0277147 | A1 * | 11/2009 | Honas | A01D 57/20 56/208 |
| 2009/0277148 | A1 * | 11/2009 | Sethi | A01D 57/20 56/208 |
| 2009/0288383 | A1 * | 11/2009 | Sauerwein | A01D 57/20 56/181 |
| 2012/0096825 | A1 | 4/2012 | Sauerwein et al. | |

OTHER PUBLICATIONS

U.S. Appl. No. 15/725,231, filed Oct. 4, 2017, by Yanke et al.
U.S. Appl. No. 15/782,518, filed Oct. 12, 2017, by Brimeyer et al.
European Search Report issued in counterpart European Patent Application No. 19020467.7 dated Dec. 17, 2019 (6 pages).

* cited by examiner

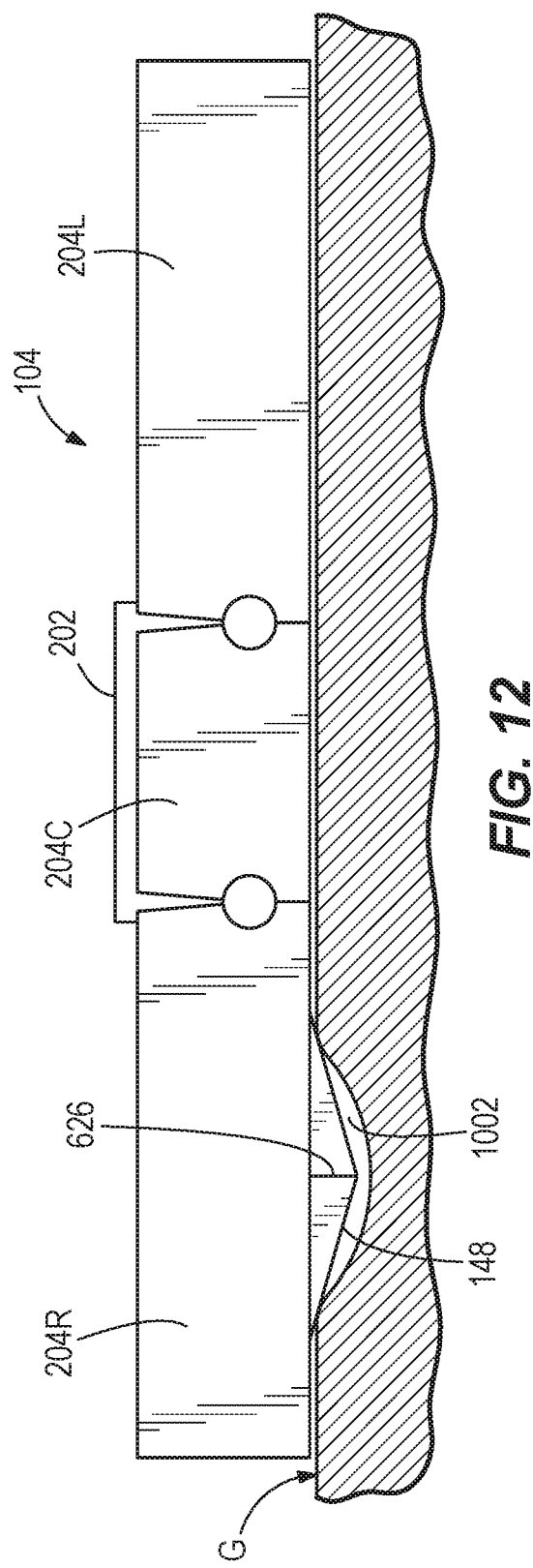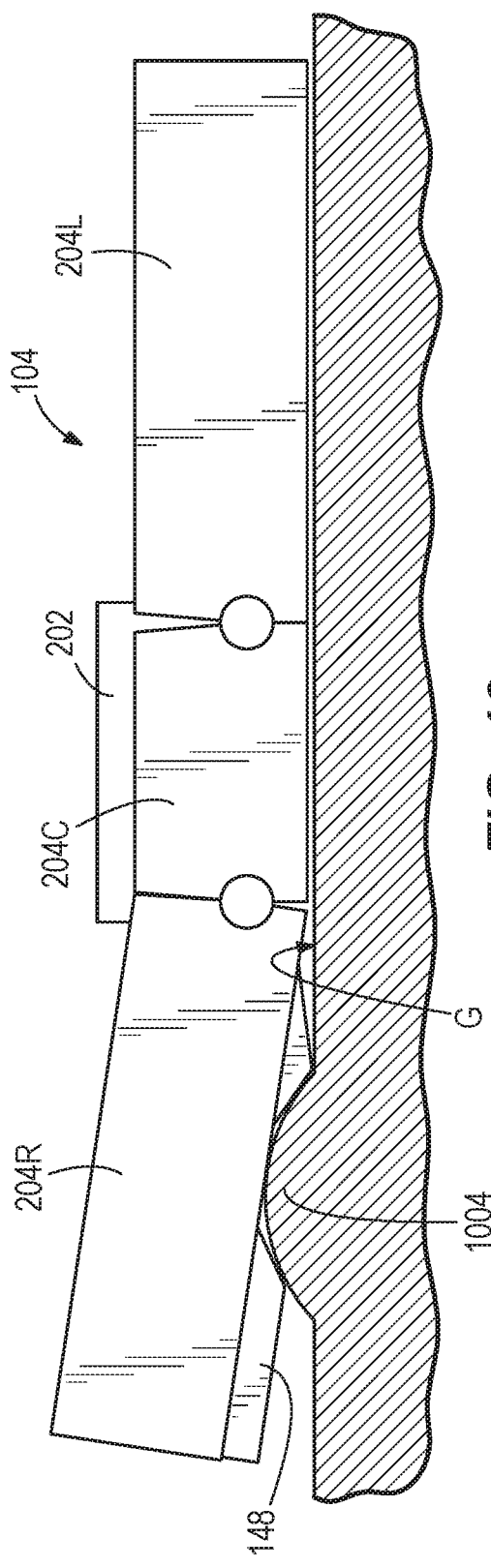

SYSTEM AND METHOD FOR GROUND FOLLOWING OF A COMBINE HEADER WITH FLEXIBLE CUTTER BAR

BACKGROUND

The disclosure relates to headers for combine harvesters, and more particularly headers having flexible cutter bars for ground following during crop cutting.

SUMMARY

The disclosure provides, in one aspect, a harvesting head for a combine. The harvesting head includes an attachment frame provided at an aft end of the head for attachment with a combine feederhouse. A main frame of the harvesting head is movably connected to the attachment frame to define a roll center therebetween, and the main frame has a range of travel about the roll center with respect to the attachment frame. At least one resilient float element is provided between the attachment frame and the main frame and operable to exert a lifting force on the main frame. A flexible cutterbar is positioned at a forward edge of the main frame and operable to reciprocate for cutting crop material from the ground. The cutterbar is supported on the main frame by a plurality of pivoting arms distributed across a width of the head. With the main frame in a nominal intermediate position within the range of travel, the plurality of pivoting arms have 10 percent or less of total available travel as upward travel and at least 90 percent of total available travel as downward travel when the harvesting head is set in the nominal position.

The disclosure provides, in another aspect, a harvesting head for a combine. The harvesting head includes an attachment frame provided at an aft end of the head for attachment with a combine feederhouse. A main frame of the harvesting head is movably connected to the attachment frame to define a roll center therebetween, and the main frame has a range of travel about the roll center with respect to the attachment frame. At least one resilient float element is provided between the attachment frame and the main frame and operable to exert a lifting force on the main frame. A cutterbar is positioned at a forward edge of the main frame and operable to reciprocate for cutting crop material from the ground. The cutterbar extends across a width of the head and is flexible throughout. The cutterbar is supported on the main frame by a plurality of pivoting arms distributed across the width of the head. With the main frame centered in the range of travel, each of the plurality of pivoting arms is pivoted maximally upward into contact with a corresponding top stop on the main frame so that the cutterbar is in an uppermost position that is configured to follow ground irregularities exclusively in a downward travel direction from the main frame.

The disclosure provides, in yet another aspect, a method of operating a combine with a harvesting head. The harvesting head is provided having a main frame movably supported by a first resilient float system on an attachment frame, and having a flexible cutterbar supported by a second resilient float system with a plurality of pivoting arms on the main frame. The attachment frame is secured to a combine feederhouse. A nominal position of the feederhouse that rests the plurality of pivoting arms on the ground and transmits ground force through the plurality of pivoting arms to the main frame to deflect the first resilient float system and move the main frame upward relative to the attachment frame is set so that the main frame is in the center of a range of available travel with respect to the attachment frame. The combine is operated over irregular ground, and during operation, ground force is transmitted from an upward ground irregularity through a first one of the plurality of pivoting arms directly to the main frame without requiring any initial take-up of the first one of the plurality of pivoting arms with respect to the main frame. In response to upward articulation of the main frame by the transmitted ground force, a second one of the plurality of pivoting arms stays in contact with the ground by falling from its uppermost position on the main frame by an amount up to its full range of travel in order to follow the ground adjacent the upward ground irregularity.

Further aspects of the disclosure can include combinations of any or all of the features set forth in the following paragraphs.

A harvesting head for a combine includes an attachment frame provided at an aft end of the head for attachment with a combine feederhouse; a main frame movably connected to the attachment frame to define a roll center therebetween, wherein the main frame has a range of travel about the roll center with respect to the attachment frame; at least one resilient float element provided between the attachment frame and the main frame and operable to exert a lifting force on the main frame; and a flexible cutterbar positioned at a forward edge of the main frame and operable to reciprocate for cutting crop material from the ground. The cutterbar is supported on the main frame by a plurality of pivoting arms distributed across a width of the head. With the main frame in a nominal intermediate position within the range of travel, the plurality of pivoting arms have 10 percent or less of total available travel as upward travel and at least 90 percent of total available travel as downward travel when the harvesting head is set in the nominal position.

With the main frame centered in the range of travel, each of the plurality of pivoting arms is pivoted maximally upward into contact with a corresponding top stop on the main frame so that the cutterbar is in an uppermost position that is configured to follow ground irregularities exclusively in a downward travel direction from the main frame.

The pivoting arms are biased upwardly to partially counterbalance a weight of the cutterbar supported thereby.

Resilient float elements upwardly biasing the plurality of pivoting arms provide a maximum lifting force defining a lower limit position of the plurality of pivoting arms relative to the main frame, and force from the ground pivots the plurality of pivoting arms upward from their lower limit positions.

The plurality of pivoting arms pivot about a point at or below ground level when the main frame is in the nominal intermediate position.

The at least one resilient float element provided between the attachment frame and the main frame is passive in its operation and not actively controlled.

The pivoting arms are supported by a passive resilient float system including at least one resilient float element.

The resilient float system comprises one resilient float element for each of the plurality of pivoting arms.

The main frame includes a plurality of top stops defining respective upper limit positions for the plurality of pivoting arms.

The main frame is provided in sections including a center section and respective left and right sections extending in opposite lateral directions from the center section, wherein the left and right sections are individually pivotably supported relative to the center section.

The left and right sections are supported by a passive resilient floatation system with respect to the center section.

The cutterbar of the harvesting head extends across the width of the head and is flexible throughout.

An agricultural work vehicle comprising a combine and the harvesting head according to any one of the preceding claims.

A method of operating a combine with a harvesting head includes providing a harvesting head having a main frame movably supported by a first resilient float system on an attachment frame, and having a flexible cutterbar supported by a second resilient float system with a plurality of pivoting arms on the main frame; securing the attachment frame to a combine feederhouse; setting a nominal position of the feederhouse that rests the plurality of pivoting arms on the ground and transmits ground force through the plurality of pivoting arms to the main frame to deflect the first resilient float system and move the main frame upward relative to the attachment frame so that the main frame is in the center of a range of available travel with respect to the attachment frame; operating the combine over irregular ground; during operation of the combine, transmitting ground force from an upward ground irregularity through a first one of the plurality of pivoting arms to the main frame after an initial take-up of the first one of the plurality of pivoting arms with respect to the main frame, the initial take-up being zero percent to 10 percent of total available travel; and in response to upward articulation of the main frame by the transmitted ground force, allowing a second one of the plurality of pivoting arms to stay in contact with the ground adjacent the upward ground irregularity.

The ground force is transmitted from the upward ground irregularity through the first one of the plurality of pivoting arms directly to the main frame with zero initial take-up of the first one of the plurality of pivoting arms with respect to the main frame.

Further aspects are set forth in the detailed description and accompanying drawings.

BRIEF DESCRIPTION OF THE DRAWINGS

FIG. 10A is a cross-sectional view of the agricultural harvesting head of FIG. 7 showing a third float arm arrangement, while

FIG. 12 is a front view of the harvesting head encountering a first ground irregularity, accommodated by the float arm arrangement alone.

FIG. 13 is a front view of the harvesting head encountering a second ground irregularity, accommodated in part by the float arm arrangement.

DETAILED DESCRIPTION

Before any embodiments are explained in detail, it is to be understood that the disclosure is not limited in its application to the details of construction and the arrangement of components set forth in the following description or illustrated in the accompanying drawings. The terms "side-to-side," "sideways," "laterally," or "lateral" refer to a direction that is horizontal and generally parallel to the longitudinal extent of the agricultural harvesting head itself. This direction is perpendicular to a direction of travel "V" of the machine as it travels through the field harvesting crops. The terms "in front of," "front," "forward," "fore," and the like refer to the direction of travel "V." The terms "back," "rear," "behind," "to the rear of" and the like refer to a direction opposite to the direction of travel "V."

Figure 1:
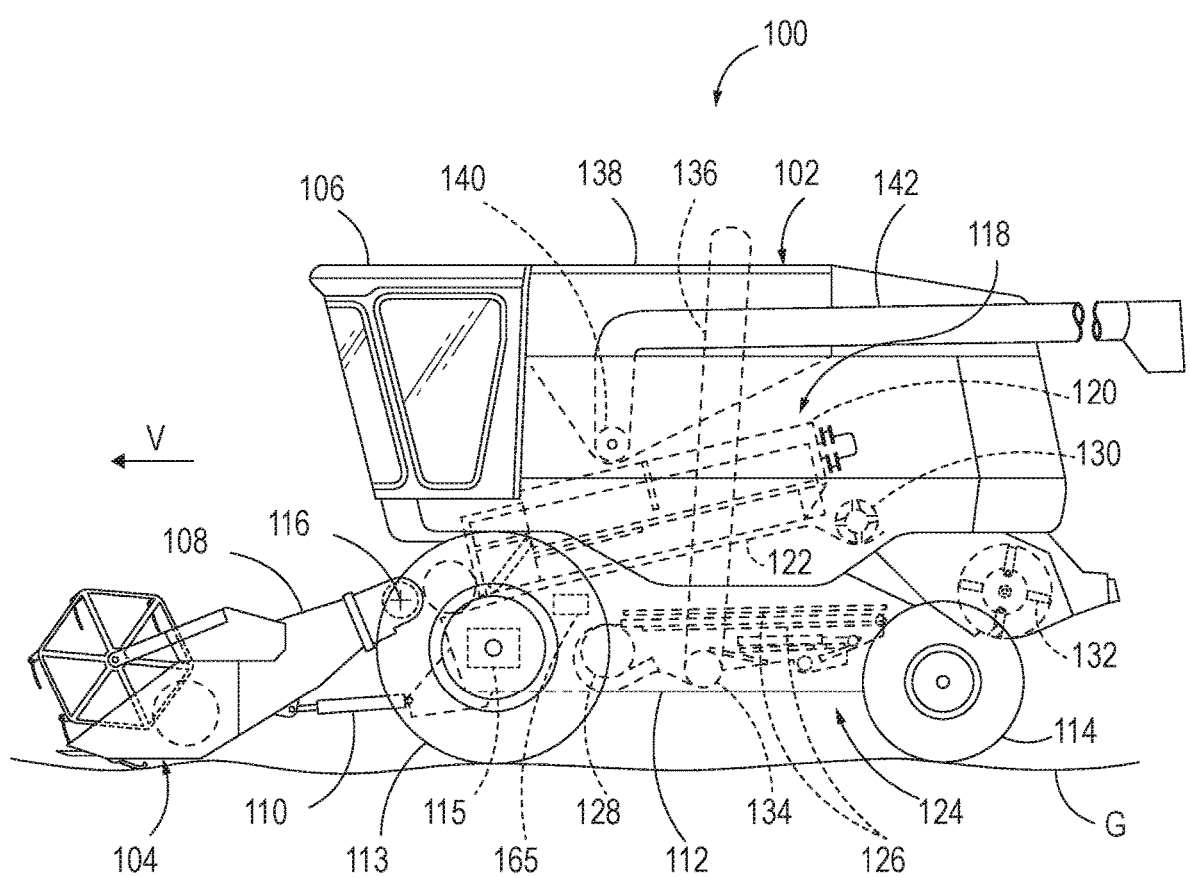
FIG. 1 is a side view of an agricultural vehicle.

FIG. 1 illustrates an agricultural vehicle 100 including a combine harvester 102 and an agricultural harvesting head 104, or "header", supported on the front of the vehicle 100. The combine harvester 102 includes an operator cabin 106 that contains controls for piloting and operating the combine harvester. A feederhouse 108 is pivotally coupled to the front of the combine harvester 102. One or more actuators 110 are coupled to and between the feeder house 108 and a chassis 112 of the combine harvester 102 to support the forward end of the feederhouse 108 and the agricultural harvesting head 104 above the ground. The chassis 112 is supported on wheels 114 that are driven by hydraulic motors 115 for travel over the ground level G1.

The actuators 110 are double-acting hydraulic cylinders capable of moving from an extended position to a retracted position. When the actuators 110 are extended, the forward end of the feederhouse 108 and the agricultural harvesting head 104 are raised upward, pivoting clockwise (in FIG. 1) about a pivot joint 116 that couples the feederhouse 108 to the chassis 112. When the actuators 110 are retracted, the forward end of the feederhouse 108 and the agricultural harvesting head 104 are lowered, pivoting counterclockwise (in FIG. 1) about the pivot joint 116.

Thus, by extending and retracting the actuators 110, the height of the feederhouse 108 and the agricultural harvesting head 104 can be varied. Furthermore, changing the hydraulic fluid pressure in the actuators 110 will change the amount of downforce exerted by the agricultural harvesting head 104 against the ground. As the hydraulic fluid pressure in the actuators 110 increases, the downforce applied by the agricultural harvesting head 104 to the ground will decrease. As the hydraulic fluid pressure in the actuators 110 decreases, the downforce due to the weight of the agricultural harvesting head 104 will increase. In an alternative arrangement, the actuators 110 can be electric or pneumatic devices such as linear or rotary motors.

The combine harvester 102 receives crop cut by the agricultural harvesting head 104 and conveys it into a threshing system 118. The threshing system 118 includes a rotor 120 that rotates against a concave 122 to separate grain from at least a portion of the "material other than grain" (MOG). The grain falls downward into a cleaning system 124. The cleaning system 124 includes at least one sieve or chaffer 126. Because the grain in the cleaning system can include some light MOG, the cleaning system 124 also includes a fan 128 that blows air through the sieve or chaffer 126. This airflow levitates light MOG and carries it rearward where it is deposited on the ground.

A re-thresher 130 is provided at the rear of the threshing system 118 to receive the MOG separated from the grain. Grain remaining within the MOG is further separated from the MOG in the re-thresher 130 and drops into the cleaning system 124. The MOG leaves the threshing system 118 and is conveyed backward into a chopper 132, which throws the MOG onto the ground behind the vehicle 100.

The grain that is cleaned in the cleaning system 124 is carried to an auger 134 that carries the clean grain to one side of the combine harvester 102. An elevator 136 receives the clean grain from the auger 134 and lifts the clean grain upward depositing it into a grain tank 138.

Periodically, an unloading vehicle such as a grain truck or grain cart will travel alongside the vehicle 100 and an auger 140 in the grain tank will unload the grain tank 138 through an elongate outlet 142. The elongate outlet 142 is pivoted outward from the vehicle 100 to extend over the grain truck or grain cart which receives the clean grain and carries it away for storage.

Figure 2:
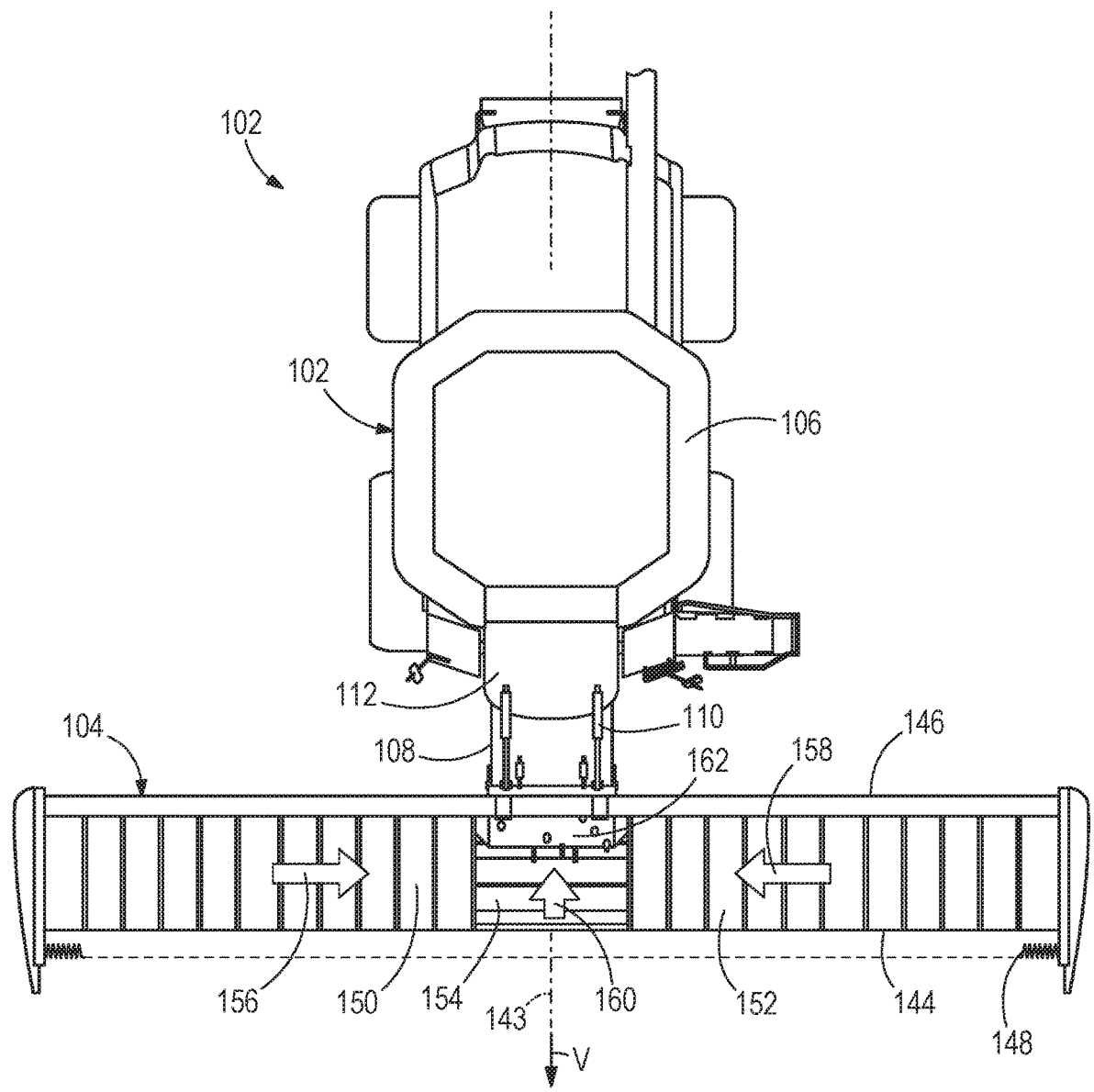
FIG. 2 is a top view of the agricultural vehicle of FIG. 1.

As shown in FIG. 2, the harvesting head 104 is supported on an end of the feederhouse 108 and extends transversely to direction of travel V and to a central axis 143 of the harvester vehicle 102. The harvesting head 104 can also have a center axis that is aligned with the central axis 143 of the harvester vehicle 102. In the illustrated embodiment, the harvesting head 104 is wider than the chassis 112. The harvesting head 104 includes a forward edge 144, a rear edge 146, and a cutterbar 148 coupled to the forward edge 144. The cutterbar 148 extends substantially along the width of the harvesting head 104 and cuts or separates crop plants (not shown) from the ground G as the harvester vehicle 102 moves along the ground G. The cutterbar 148 may alternately be referred to as a cutting bar or reciprocating knife. The cutterbar 148 is flexible throughout (i.e., across the width of the harvesting head 104).

The harvesting head 104 supports a first or right side conveyor 150, a second or left side conveyor 152, and an intermediate or center conveyor 154 positioned between the right side conveyor 150 and the left side conveyor 152. In the illustrated embodiment, the center conveyor 154 is aligned with the chassis 112 centerline and, and each of the conveyors 150, 152, 154 are formed as endless belt conveyors. Each of the right side conveyor 150 and left side conveyor 152 comprises an endless belt that is supported on an inner roller adjacent to the center conveyor 154 and an outer roller adjacent to the respective distal ends of a main frame 204. As the cutting bar 148 severs crops from the ground G, the cut material falls onto the conveyors 150, 152, 154. The right side conveyor 150 moves cut material in a first direction 156 toward the center conveyor 154, and the left side conveyor 152 moves cut material in a second direction 158 toward the center conveyor 154. The center conveyor 154 moves the cut material in a third direction 160 past a feed drum 162 and toward the feederhouse 108.

Figure 3:
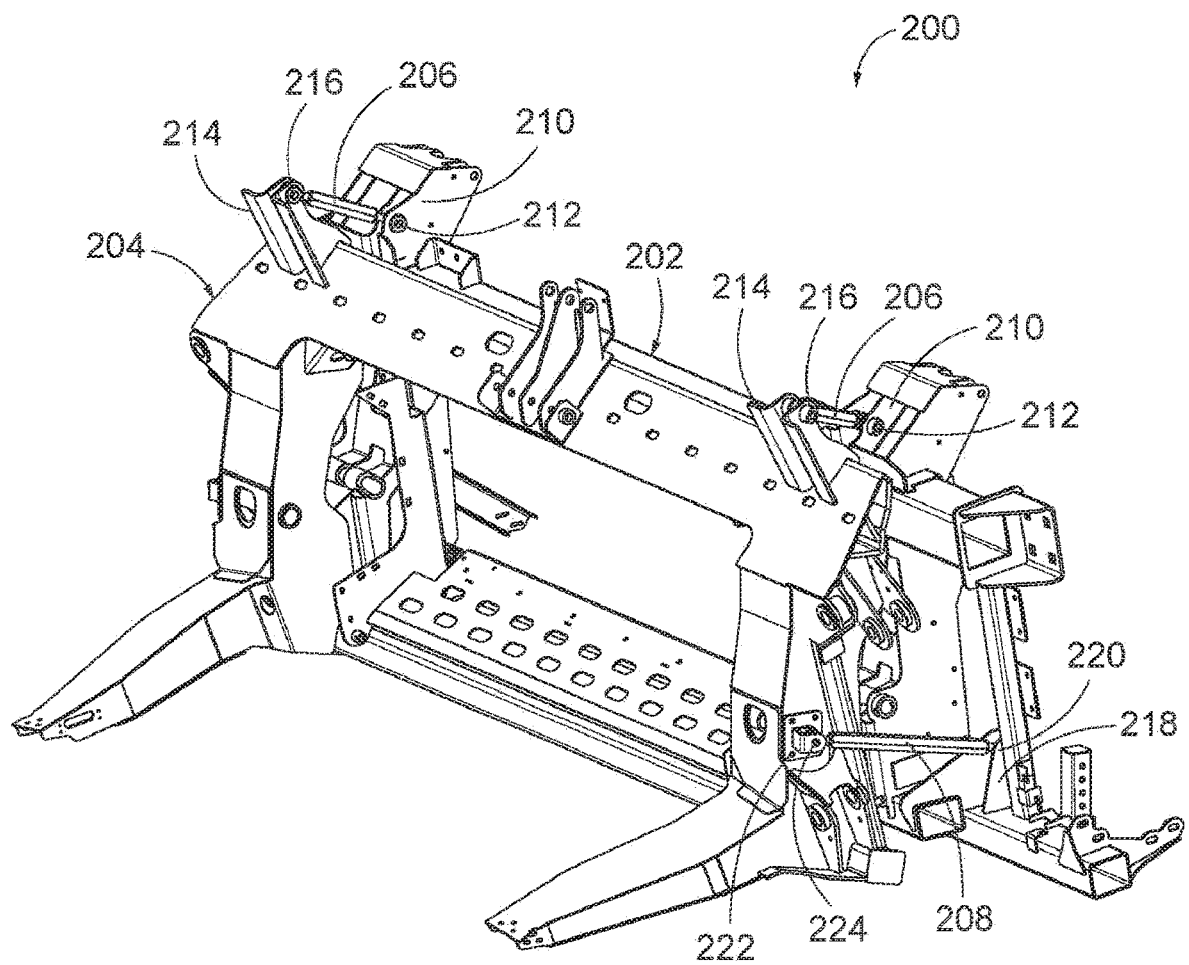
FIG. 3 is a front perspective view of a header frame section.
Figure 4:
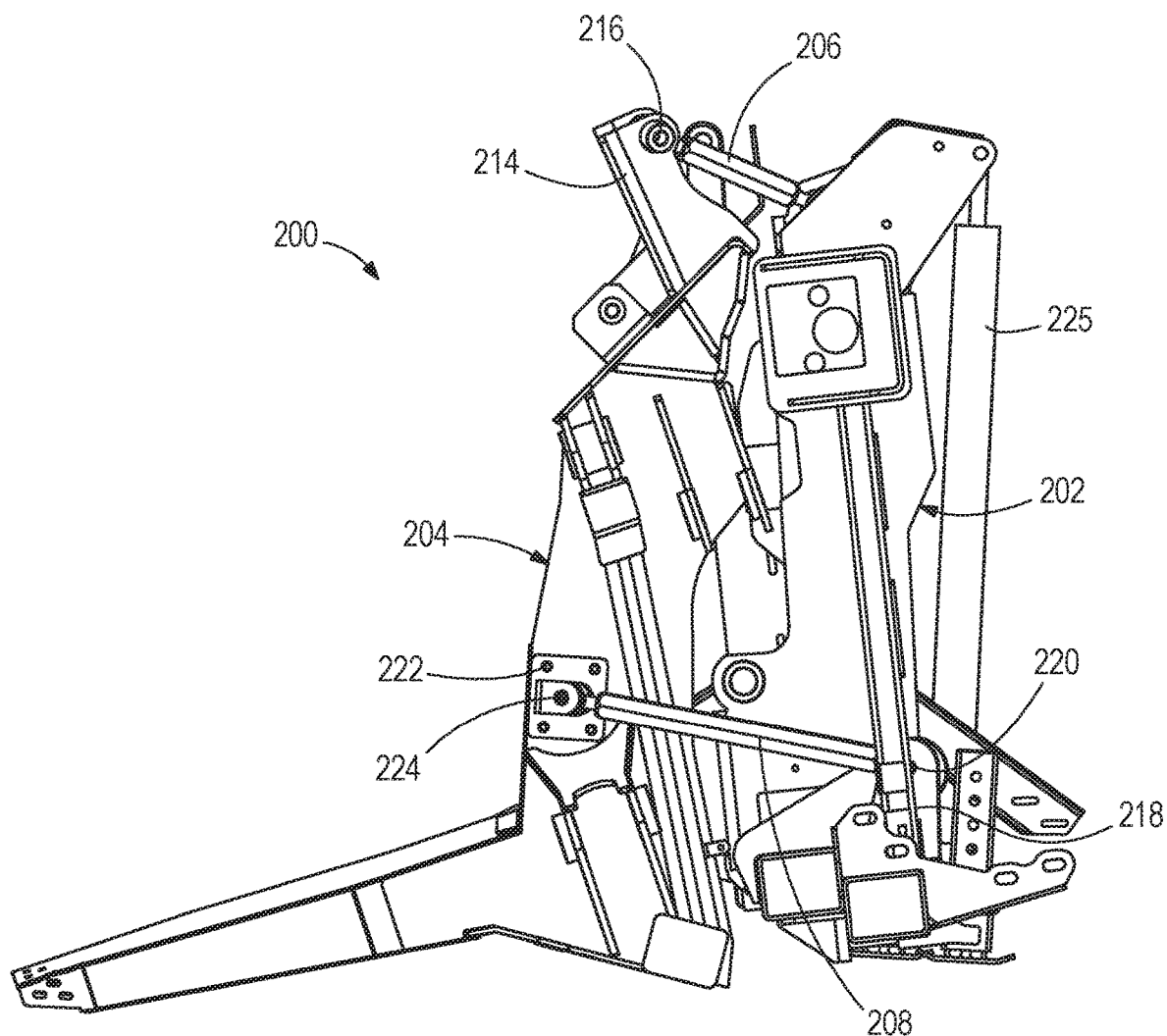
FIG. 4 is a side view of the header frame section of FIG. 3.

FIGS. 3 and 4 show an exemplary embodiment of a header frame section 200 having first and second frame portions, for example an attachment frame 202 and a main frame 204. The attachment frame 202 connects to the feederhouse 108, and the main frame 204 supports the other components of the harvesting head 104, for example the cutterbar 148 and conveyors 150, 152, 154 shown in FIG. 2.

The main frame 204 is pivotally connected to the attachment frame 202 by a pair of upper control arms 206 and a pair of lower control arms 208. The upper control arms 206 are pivotally connected to a first bracket 210 on the attachment frame 202 at a first connection point 212 and pivotally connected to a second bracket 214 on the main frame 204 at a second connection point 216. The lower control arms 208 are pivotally connected to a third bracket 218 on the attachment frame 202 at a third connection point 220 and pivotally connected a fourth bracket 222 on the main frame 204 at a fourth connection point 224. The upper and lower control arms 206, 208 allow for height adjustment of the main frame 204 as it traverses uneven ground. In particular, one or more resilient float elements (e.g., springs or hydraulic cylinders) 225 are provided and arranged to exert a lifting force on the main frame 204. Although movement of the feederhouse 108 by the actuators 110 can raise or lower the harvesting head 104 as needed, the main frame 204 of the harvesting head 104 is supported by the resilient float elements 225 for movement relative to the feederhouse 108 and the attachment frame 202 secured thereto. The main frame 204 of the harvesting head 104 may float passively relative to the feederhouse 108 and the attachment frame 202 by the resilient float elements 225, without being actively controlled. Although the main frame 204 is movably supported by the attachment frame 202, the main frame 204 has a limited range of travel. A nominal position of the main frame 204 and of the resilient float element(s) 225 is defined as an intermediate position within the range of travel, from which position the main frame 204 has the capability to travel in an upward direction and an opposite downward direction with respect to the attachment frame 202. The harvesting head 104 is configured to assume the nominal position on flat, level ground (i.e., when there is no need for following upward or downward ground irregularities). Although the actuators 110 are operable to vary the position of the feederhouse 108 and thus the position of the main frame 204 with respect to the attachment frame 202 by inducing more or less ground force, the nominal position of the feederhouse 108 and the actuators 110 is also taken as the position or setting that corresponds to or brings about the nominal position of the main frame 204. In some constructions, the nominal position is defined as the main frame 204 being at the center of the range of travel with respect to the attachment frame 202, and the feederhouse position corresponding thereto, such that equal amounts of upward and downward travel from the nominal position are available.

In an exemplary embodiment the control arms 206, 208 extend along an axial direction that is non-parallel to the chassis axis 143. The upper control arms 206 are angled so that they diverge from the chassis axis 143 in the direction of travel V, with the first connection point 212 positioned closer to the chassis axis 143 than the second connection point 216. The lower control arms 208 are angled so that they converge toward the chassis axis 143 in the direction of travel V, with the third connection point 220 positioned further from the chassis axis 143 than the fourth connection point 224. In other embodiments, the control arms 206, 208 can extend along an axis in a common plane which may or may not be parallel to the plane of the chassis axis 143.

Figure 5:
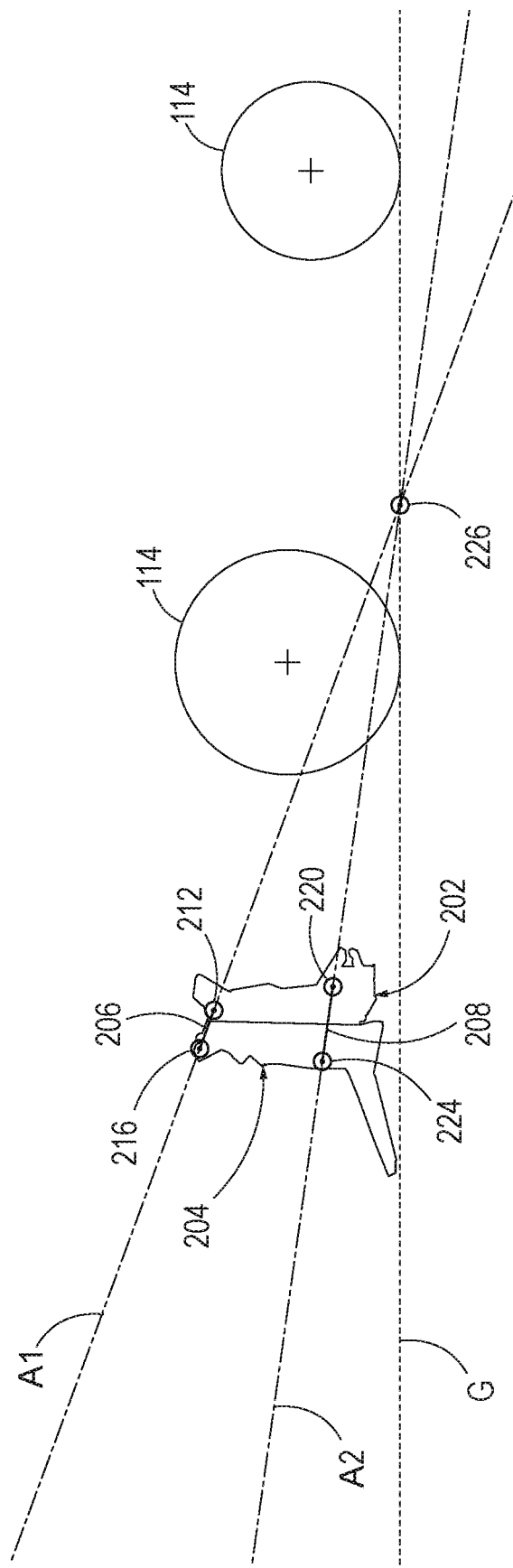
FIG. 5 is a schematic view depicting a first exemplary roll center of the frame section of FIG. 3 positioned at ground level.
Figure 6:
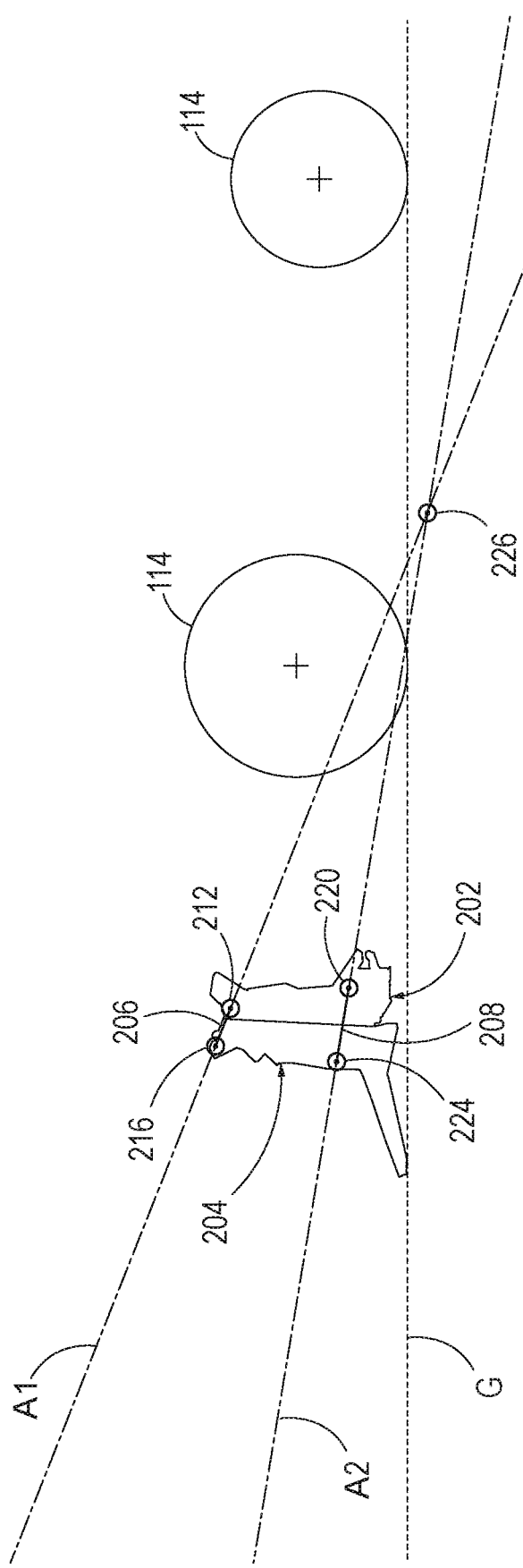
FIG. 6 is a schematic view depicting a second exemplary roll center of the frame section of FIG. 3 positioned below ground level.

FIGS. 5 and 6 show a simplified, two-dimensional representation of the attachment frame 202, the main frame 204, the upper control arms 206, the lower control arms 208 and the first through fourth connection points 212, 216, 220, 224 that define a roll center 226 for the attachment frame. FIG. 5 shows a first roll center 226 positioned at ground level G and FIG. 6 shows a second roll center 226 positioned below ground level G. In this schematic view the attachment frame 202, the main frame 204, the upper control arms 206, and the lower control arms 208 form a four-bar linkage with the intersection of the control arms 206, 208 defining the roll center 226.

In the illustrated embodiments, the roll center 226 is defined at the intersection between an upper control arm axis A1 and a lower control arm axis A2. As discussed above, the control arms 206, 208 can extend non-parallel to the chassis axis 143 and in different planes. Accordingly, the roll center 226 is determined by a planar or two-dimensional representation of the upper and lower control arm axes A1, A2. The upper control arm axis A1 is defined by the axis that extends through the first and second connection points 212, 216 viewed in a single plane. The lower control arm axis A2 is defined by the axis that extend through the third and fourth connection points 220, 224 viewed in a single plane. FIG. 5 shows an embodiment in which the upper control arm axis A1 and the lower control arm axis A2 intersect at ground level G, therefore creating a roll center 226 at ground level G. FIG. 6 shows an embodiment in which the upper control arm axis A1 and the lower control arm axis A2 intersect below ground level G, therefore creating a roll center 226 below ground level G. Because the ground level position is not typically flat (as shown in FIG. 1), the term ground level can mean ground level in the ordinary use of the term and also as a plane defined by the lower points of the front and back wheels 114, or other ground engaging members such as treads. As shown in FIGS. 5 and 6, both roll centers 126 are positioned below the harvester 102 and also between the wheels 114.

As mentioned, when the vehicle 100 is traveling, the height of the ground can vary. Abrupt changes in height can cause engagement of the harvesting head 104 with the ground. Striking the ground creates a draft force that can increase the downward load on the main frame 204 and dislodges the proper position of the cutterbar 148, causing it to dig into the ground instead of cutting material just above ground level. When this happens repeatedly, the cutterbar 148 can become clogged with debris, and an operator will have to stop the operation of the agricultural vehicle 100 to clear the debris. By positioning the roll center at or below ground level, the draft forces acting on the harvester head 104 will act to lift the cutterbar 148, helping it to ride up and over crop material more easily, rather than pushing material in front of the cutterbar 148.

In addition to the movement afforded between the main frame 204 and the attachment frame 202, movement or articulation within the main frame 204 may be enabled by a main frame 204 provided in sections such as a center section 204C, a left section or "wing" 204L movably (e.g., pivotally) coupled to the center section 204C, and a right section or "wing" 204R movably (e.g., pivotally) coupled to the center section 204C. Fore-and-aft extending pivot axes may be defined between the center section 204C and each of the left and right sections 204L, 204R. Each of the pivot axes can be defined by a simple hinge pin or by multiple links that define a point of intersection. The left and right sections 204L, 204R may be independently supported with respect to the center section 204C with one or more resilient float elements (e.g., springs or hydraulic cylinders). In some constructions, the floatation system provided for the left and right sections 204L, 204R by the resilient float elements is a passive floatation system that is not actively controlled.

Figure 7:
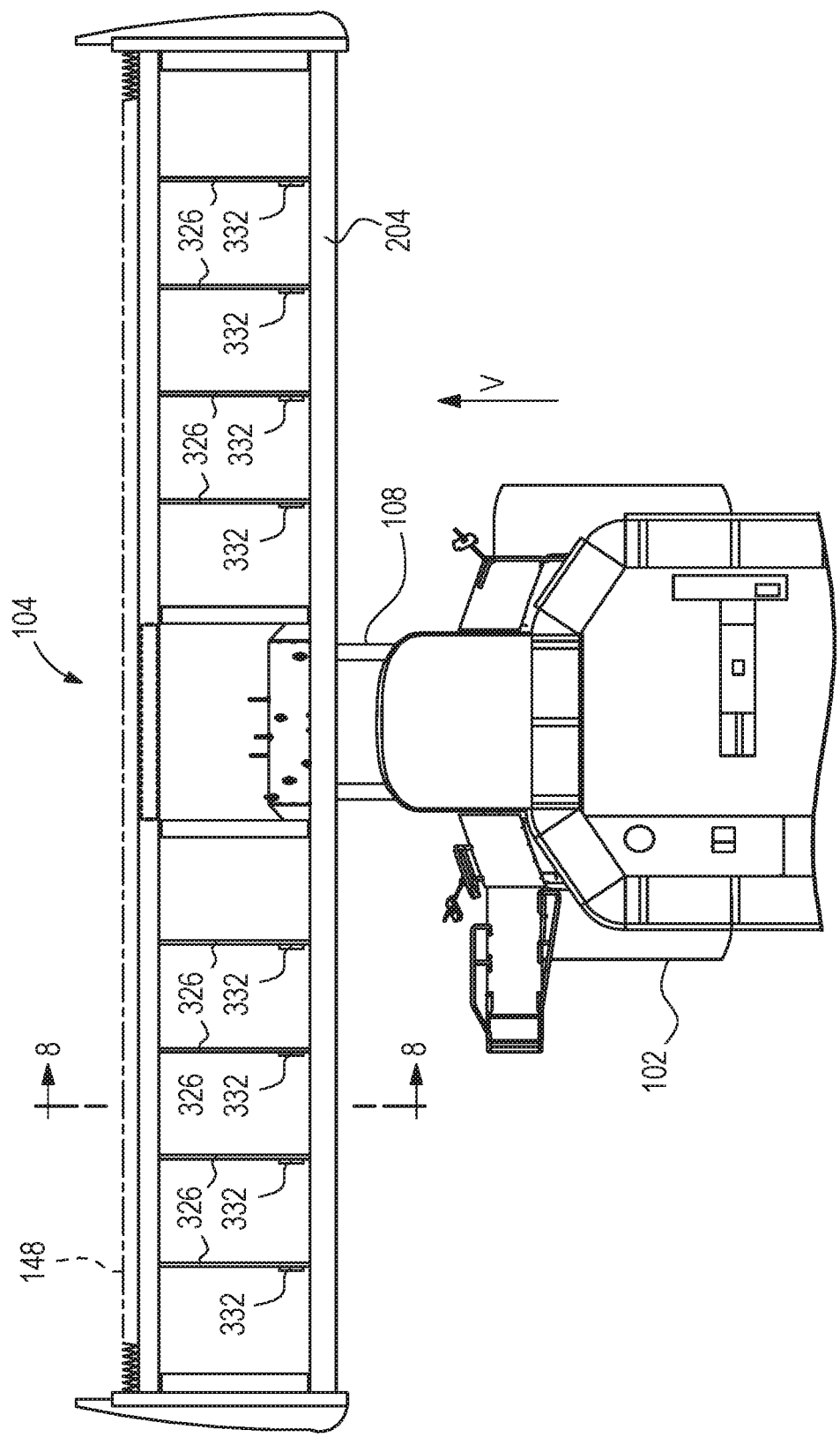
FIG. 7 is a plan view of the agricultural vehicle of FIG. 1, having belts removed to illustrate a plurality of cutterbar-supporting pivoting arms.
Figure 8:
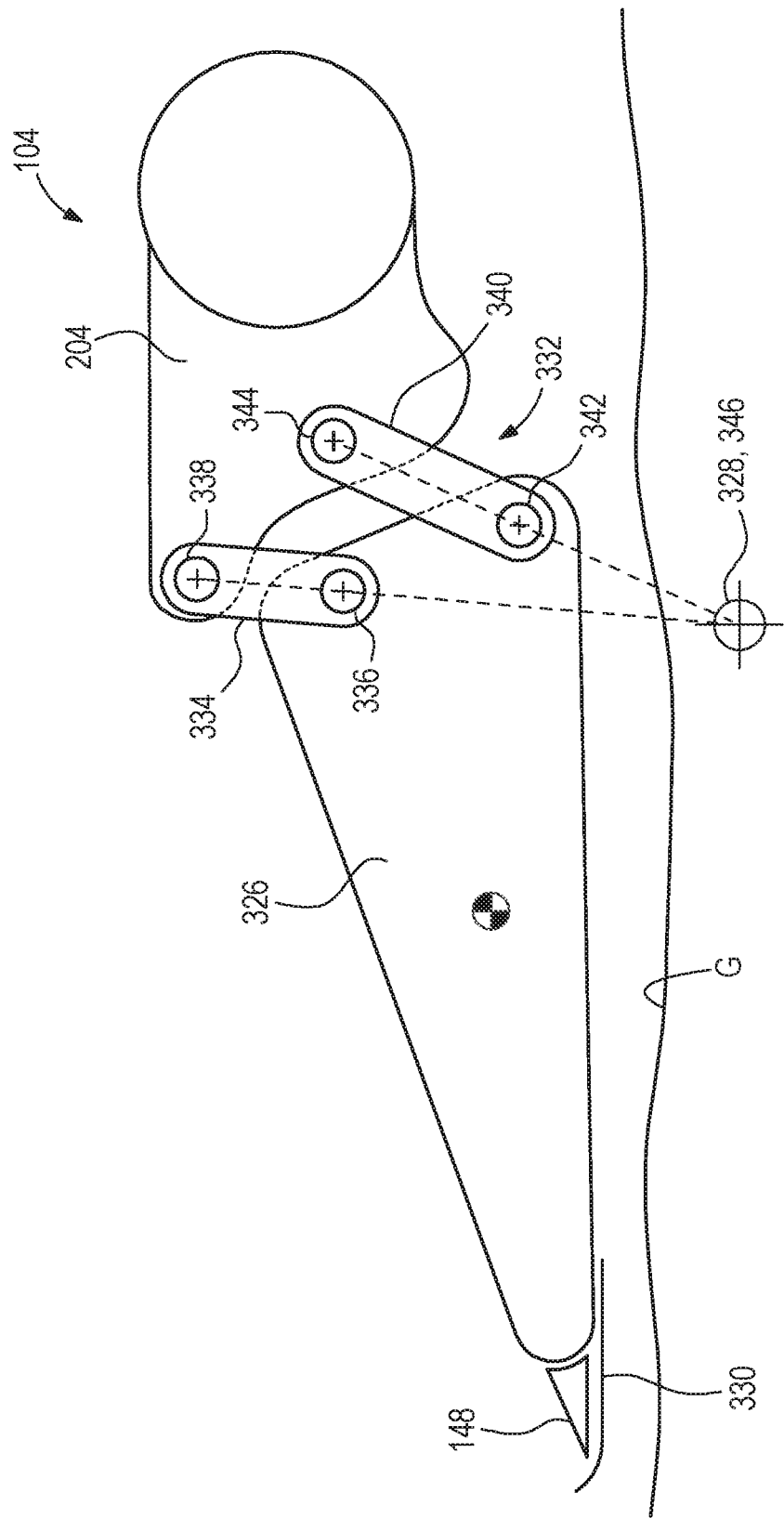
FIG. 8 is a cross-sectional view of the agricultural harvesting head of FIG. 7 taken at section line 8-8 and showing a first float arm arrangement in accordance with the present invention.
Figure 9:
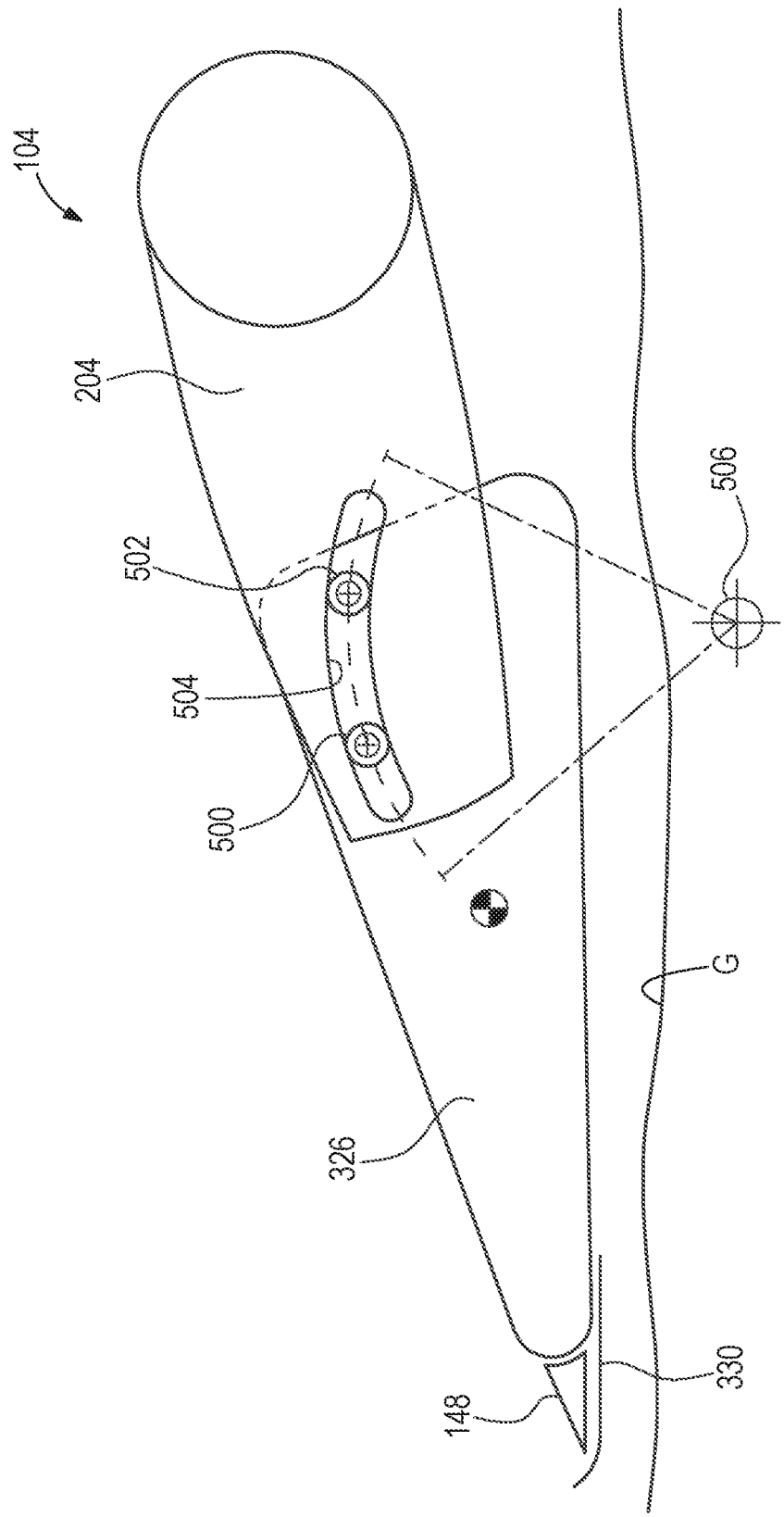
FIG. 9 is a cross-sectional view of the agricultural harvesting head of FIG. 7 showing a second float arm arrangement in accordance with the present invention.

As shown in FIGS. 7-9, each of a plurality of pivoting arms 326 (or "float arms") is pivotally coupled to the main frame 204 at the rear ends to pivot about a corresponding horizontal and laterally extending pivot axis 328. The pivoting arms 326 are spaced apart across the width of the agricultural harvesting head 104 to provide distributed support to the cutterbar 148.

The cutterbar 148 is fixed to and supported on the front ends of the pivoting arms 326. The cutterbar 148 is flexible along its length in a generally vertical direction such that it can flex and follow the contours of the ground (e.g., even assuming multiple arcs within either half thereof) as the ground rises and falls underneath the agricultural harvesting head 104 during forward travel. The pivoting arms 326 on which the cutterbar 148 is supported accommodate this up-and-down flexing of the reciprocating knife and hold the cutterbar 148 in position at the forward margin of the agricultural harvesting head 104.

Each of the pivoting arms 326 has a skid 330 fixed to its front end adjacent to the cutterbar 148. As the agricultural harvester travels over the field, this skid 330 can lightly drag along the ground. As the ground presses up against the skid 330 the force provided by the ground lifts the forward end of the pivoting arms, causing them to pivot upward about their pivot points.

FIG. 8 is a side view of a single pivoting arm 326. This pivoting arm is the same as all the other pivoting arms 326 that are supported on the main frame 204. In the pivoting arm arrangement of FIG. 8, a multi-bar linkage 332 couples the pivoting arm 326 to the main frame 204. This multi-bar linkage 332 includes a first link 334 extending between the pivoting arm 326 and the main frame 204. The first link 334 is pivotally coupled to the pivoting arm 326 at a first pivot joint 336 and is pivotally coupled to the main frame 204 at a second pivot joint 338. The multi-bar linkage 332 includes a second link 340 extending between the pivoting arm 326 and the main frame 204. The second link 340 is pivotally coupled to the pivoting arm 326 at a first pivot joint 342, and is pivotally coupled to the main frame 204 to second pivot joint 344.

The first link 334, the second link 340, the pivoting arm 326 and the main frame 204 function together to define a four bar linkage. Due to the geometry of the four bar linkage, the pivoting arm 326 pivots with respect to the main frame 204 about a pivot point 346 that is disposed below the pivoting arm 326, below the cutterbar 148, below the skid 330, and below the surface of the ground G.

The pivot point 346 is lower than pivot points are in the prior art. Therefore, if the cutterbar 148 or the skid 330 at the forward end of the pivoting arm 326 digs into the ground or runs into an object lying on the ground, the horizontal force applied to the cutterbar or skid by these obstacles will cause the pivoting arm 326 to lift upwards, away from the obstacle, as the pivoting arm 326 is forced backwards. This rearward and upward movement of the pivoting arm 326 will therefore tend to lift the front end of the arm 326 out of the ground and thus reduce the horizontal force. In short, the cutterbar 148 and skid 330 are lifted upward away from contact, rather than force downward into deeper contact us they would be if they pivoted about a pivot point located above the skid shoe and the cutterbar as shown in the prior art.

In this manner, any damage to the agricultural harvesting head 104 due to collisions with obstacles in the field is reduced.

There are other pivot joint arrangements that similarly permit a pivoting arm 326 to pivot about a pivot point below the pivot arm, the reciprocating knife, and/or the shoe when encountering an obstacle in the field.

In FIG. 9, for example, two rollers 500, 502 are fixed to the pivoting arm 326. The main frame 204 has as an elongate curved slot 504 that receives the two rollers 500, 502. The slot 504 is longer than the distance between the two rollers 500, 502 and has the same width as the diameter of the two rollers 500, 502. Therefore, the pivoting arm 326 is constrained to roll back and forth in the slot 504. Due to the curvature of the slot 504, the pivoting arm 326 effectively pivots about a pivot point 506. Pivot point 506 is located at the center of curvature of the elongate curved slot 504.

Pivot point 506 (like pivot point 346 in the previous arrangement) causes the pivoting arm 326 to pivot with respect to the elongate frame 124 about pivot point 506. Pivot point 506 is disposed below the pivoting arm 326, below the cutterbar 148, below the skid 330, and below the surface of the ground G.

Figure 10A:
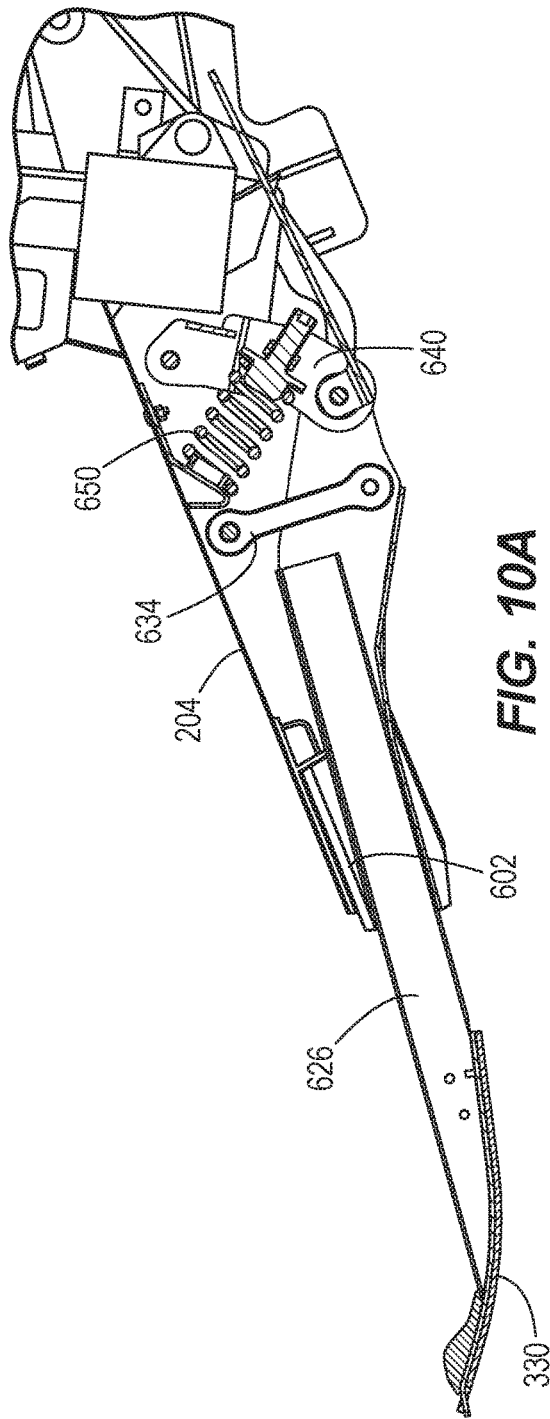
Figure 10B:
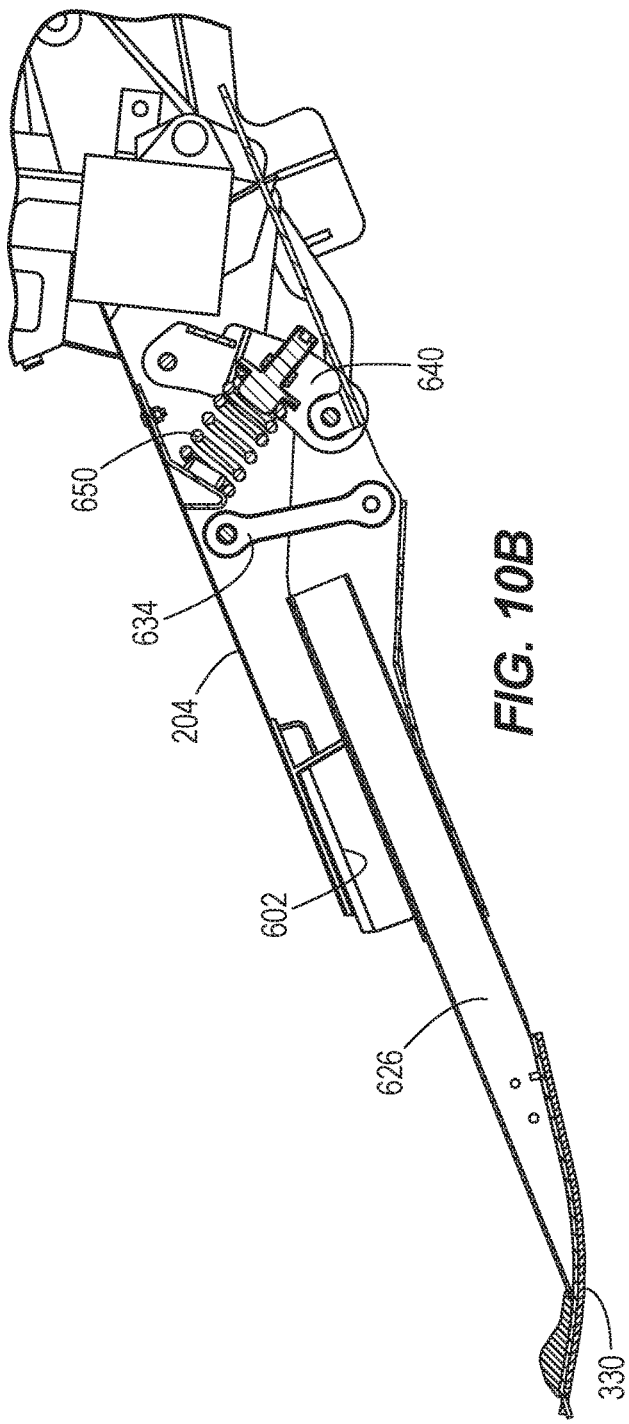
FIG. 10B is a cross-sectional view of the third float arm arrangement of FIG. 10A showing a downwardly pivoted position.
Figure 11:
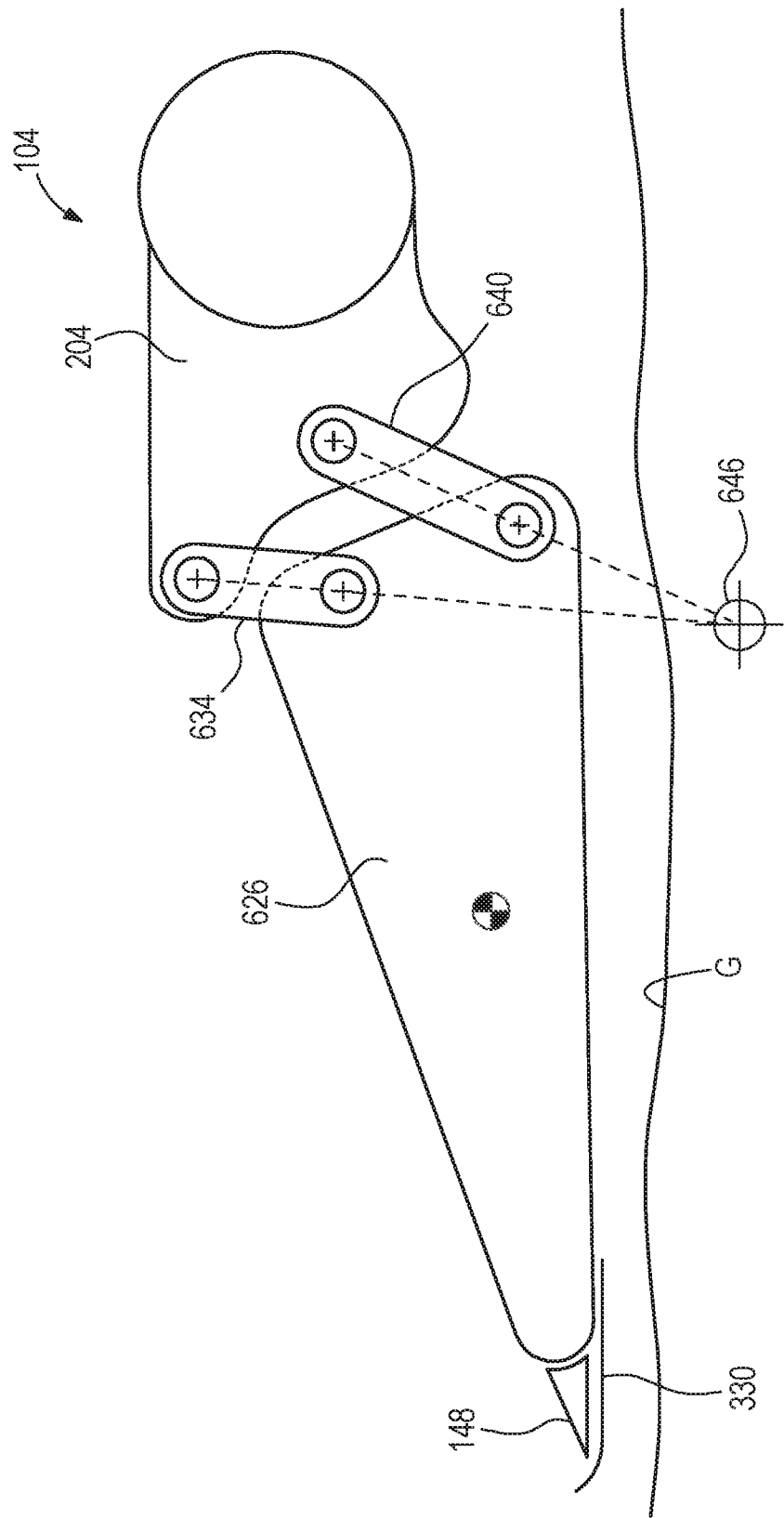
FIG. 11 is a schematic cross-sectional view of the third float arm arrangement of FIGS. 10A and 10B.

FIGS. 10A, 10B, and 11 illustrate another pivoting arm arrangement for the harvesting head 104, and this arrangement is provided with pivoting arms 626 supported by first and second links 634, 640 similar to those of FIG. 8 for defining a pivot point 646 (FIG. 11) with respect to the main frame 204 that is disposed below the pivoting arm 626, below the cutterbar 148, below the skid 330, and below the surface of the ground G. A resilient float element 650 (e.g., spring or hydraulic cylinder) acts on the four-bar linkage (e.g., between the main frame 204 and the second link 640) to bias the pivoting arm 626 upward to counter the weight of the cutterbar 148. In a completely passive arrangement, a maximum downward position of the pivoting arm 626 is defined for example by a spring constant or hydraulic pressure of the resilient float element 650. As shown in FIG. 10A, each pivoting arm 626 has a limit of upward travel or rotation (clockwise in FIG. 10A) provided by a stop 602. All of the pivoting arms 626 throughout the harvesting head 104 may also have respective stops 602. The stops 602 are provided on the main frame 204. The stops 602 are configured at a common height throughout the harvesting head 104 so that all the pivoting arms 626 align with each other in side view and the cutterbar 148 is straight when all the stops 602 are engaged. Due to the stops 602, the range of travel of each pivoting arm 626 is defined in a range exclusively below the stops 602. FIG. 10B illustrates the pivoting arm 626 pivoted down away from the stop 602, which occurs as a result of the reduction of ground support from the nominal condition.

On level ground with the harvesting head 104 set in its nominal position, the pivoting arms 626 are engaged with the stops 602. To engage the pivoting arms 626 with the stops 602, force from the ground G must be exerted on the pivoting arms 626, despite the resilient float elements 650 providing an upward bias. Only when the harvesting head 104 encounters a localized downward irregularity (i.e., a dip or depression) in the ground G will the pivoting arms 626 pivot down as shown in FIG. 10B. Downward pivoting of the pivoting arms 626 is generated passively by the weight of the cutterbar 148 against the bias of the resilient float elements 650. The pivoting arms 626 need not pivot down to follow the ground G if the ground irregularity is strictly on a macro level that is capable of being followed by articulation of the floatation system between the attachment frame 202 and the main frame 204 and/or the floatation system between sections 204C, 204L, 204R or "wings" of the main frame, if so equipped. This operational configuration is described in further detail with reference to FIGS. 12 and 13.

If the harvesting head 104 is lifted completely off the ground (e.g., by the upward movement of the feederhouse 108 via the actuators 110), the cutterbar 148 will fall to its lower limit of travel with respect to the main frame 204, and the main frame 204 will fall to its lower limit of travel with respect to the attachment frame 202. When lowered to initiate ground contact and force from the ground G onto the harvesting head 104, the pivoting arms 626 (e.g., at the skids 330) contact first and begin to pivot upwardly toward the stops 602. The main frame 204 remains at its lower limit of travel. Once the pivoting arms 626 reach the stops 602, ground force is transmitted through the pivoting arms 626 and the stops 602 to the main frame 204, and with increasing ground force, the main frame 204 begins to settle toward the nominal position. Thus, when operating the harvesting head 104 over uneven ground from the nominal position, upward ground irregularities are immediately transmitted to the main frame 204 without requiring any take-up in the pivoting arms 626 (i.e., no pivoting movement prior engaging the stops 602). As such, the pivoting arms 626 are configured for one-way operation in the downward direction from the main frame 204 as the harvesting head 104 traverses the ground G. FIG. 12 shows such an example of the one-way downward operation when only a portion of the head 104 encounters a downward irregularity 1002 in the ground G. With the localized reduction in ground force to the pivoting arms 626, the pivoting arms 626 allow the cutterbar 148 to fall by its own weight with respect to the main frame 204. The pivoting arms 626 have the availability of their full range of travel since the nominal position is in engagement with the stops 602. Conversely, a portion of the harvesting head 104 may encounter an upward irregularity 1004 as in FIG. 13. When this occurs, ground force from the irregularity 1004 in the ground G is transmitted directly to the main frame 204 without requiring any take-up in the pivoting arms 626. As such, upward articulation is provided by the resilient floatation system between the main frame 204 and the attachment frame 202 and/or the resilient floatation system between the sections 204C, 204L, 204R of the main frame 204 (both are shown in the example of FIG. 13). As the main frame 204, or a section thereof, rises to the highest point of the upward irregularity 1004, adjacent portions of the flexible cutterbar 148 descend freely from the main frame 204. The full range of downward travel is available for each of the pivoting arms 626. Thus, depending on the particular ground surface, portions of the cutterbar 148 can follow level or even depressed portions of the ground G while the main frame 204 is upwardly articulated by the upward irregularity 1004. Although the description directly above is particularly directed toward the pivoting arms 626 of FIGS. 10A and 10B in which drawings the stops 602 are also illustrated, it is noted that the configurations and operations described herein with respect to the pivoting arms 626 may be equally applied to the other disclosed embodiments of pivoting arms 326 in FIGS. 7-9. Furthermore, while it has been described that the pivoting arms can be pivoted fully upward to an upper limit when the harvesting head 104 is set in the nominal position, and certain benefits are obtained by such a configuration, it is also noted that in other constructions the pivoting arms have 10 percent or less of total available travel as upward travel and at least 90 percent of total available travel as downward travel when the harvesting head 104 is set in the nominal position.

Operation of the agricultural vehicle 100 including the combine harvester 102 and the harvesting head 104 as disclosed above can obviate the need to actively manage a sensor-based ground-following routine with the combine harvester 102 whereby the positions of the various pivoting arms are monitored and used as a controller input for raising and lowering the main frame 204 (e.g., by raising and lowering the feederhouse 108 with the actuators 110). To the contrary, the above disclosed structure and method of operation need not actively manage the position of the harvesting head 104 or portions thereof. Thus, the ground-following feature of the harvesting head 104 can be entirely passive (and thus, mechanical rather than computer-controlled) within the travel range of the main frame 204 with respect to the attachment frame 202. Although designed to be fully capable of following irregular ground without sensor feedback of active positioning, the agricultural vehicle 100 may be equipped with one or more limit sensors that are configured to detect the main frame 204 reaching or approaching its maximum limit of travel (up or down) with respect to the attachment frame 202. Such detection may be configured (e.g., controller-programmed) to bring about a repositioning of the feederhouse 108 under certain conditions (e.g., time duration exceeding a threshold limit).

The foregoing detailed description of the certain exemplary embodiments has been provided for the purpose of explaining the general principles and practical application, thereby enabling others skilled in the art to understand the disclosure for various embodiments and with various modifications as are suited to the particular use contemplated. This description is not necessarily intended to be exhaustive or to limit the disclosure to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present disclosure, and are not intended to limit the structure of the exemplary embodiments of the present disclosure to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments.

Various features and advantages are set forth in the following claims.

What is claimed is:

1. A harvesting head for a combine, the harvesting head comprising:
   an attachment frame provided at an aft end of the head for attachment with a combine feederhouse;
   a main frame movably connected to the attachment frame to define a roll center therebetween, wherein the main frame has a range of travel about the roll center with respect to the attachment frame;
   a resilient float element provided between the attachment frame and the main frame and operable to exert a lifting force on the main frame; and
   a flexible cutterbar positioned at a forward edge of the main frame and operable to reciprocate for cutting crop material from the ground, wherein the cutterbar is supported on the main frame by a plurality of pivoting arms distributed across a width of the head,
   wherein, with the main frame in a nominal intermediate position within the range of travel, each pivoting arm of the plurality of pivoting arms is supported on the main frame such that it has 10 percent or less of total available travel as upward travel and at least 90 percent of total available travel as downward travel when the harvesting head is set in the nominal position, and
   wherein each pivoting arm of the plurality of pivoting arms is configured to pivot during operation about a point at or below ground level when the main frame is in the nominal intermediate position.

2. The harvesting head of claim 1, wherein the resilient float element is a first resilient float element, and wherein each pivoting arm of the plurality of pivoting arms is biased upwardly by a second resilient float element to partially counterbalance a weight of the cutterbar supported thereby.

3. The harvesting head of claim 2, wherein each second resilient float element provides a maximum lifting force defining a lower limit position of the associated pivoting arm relative to the main frame.

4. The harvesting head of claim 1, wherein the first resilient float element provided between the attachment frame and the main frame is passive in operation and not actively controlled.

5. The harvesting head of claim 1, wherein the main frame includes a plurality of top stops defining respective upper limit positions for the plurality of pivoting arms.

6. The harvesting head of claim 1, wherein the main frame is provided in sections including a center section and respective left and right sections extending in opposite lateral directions from the center section, wherein the left and right sections are individually pivotably supported relative to the center section.

7. The harvesting head of claim 6, wherein the left and right sections are supported by a passive resilient floatation system with respect to the center section.

8. A harvesting head for a combine, the harvesting head comprising:
   an attachment frame provided at an aft end of the head for attachment with a combine feederhouse;
   a main frame movably connected to the attachment frame to define a roll center therebetween, wherein the main frame has a range of travel about the roll center with respect to the attachment frame;
   at least one resilient float element provided between the attachment frame and the main frame and operable to exert a lifting force on the main frame; and
   a cutterbar positioned at a forward edge of the main frame and operable to reciprocate for cutting crop material from the ground, wherein the cutterbar extends across a width of the head and is flexible throughout, and wherein the cutterbar is supported by a plurality of pivoting arms distributed across the width of the head, each pivoting arm being pivotally supported on the main frame and having a pivot range,
   wherein, with the main frame centered in the range of travel, each pivoting arm of the plurality of pivoting arms is supported at a maximum upward position of the pivot range in contact with a corresponding top stop on the main frame so that the cutterbar is in an uppermost position that is configured to follow ground irregularities exclusively in a downward travel direction from the main frame, and
   wherein the main frame and the attachment frame are configured such that during operation the roll center is positioned at or below ground level.

9. The harvesting head of claim 8, wherein the plurality of pivoting arms are biased upwardly to partially counterbalance a weight of the cutterbar supported thereby.

10. The harvesting head of claim 9, wherein resilient float elements upwardly biasing the plurality of pivoting arms provide a maximum lifting force defining a lower limit position of the plurality of pivoting arms relative to the main frame, and force from the ground pivots the plurality of pivoting arms upward from their lower limit positions.

11. The harvesting head of claim 8, wherein the plurality of pivoting arms pivot about a point at or below ground level when the main frame is in the nominal intermediate position.

12. The harvesting head of claim 8, wherein the at least one resilient float element provided between the attachment frame and the main frame is passive in its operation and not actively controlled.

13. The harvesting head of claim 12, wherein the plurality of pivoting arms are supported by a passive resilient float system including at least one resilient float element.

14. The harvesting head of claim 13, wherein the resilient float system comprises one resilient float element for each of the plurality of pivoting arms.

15. The harvesting head of claim 8, wherein the main frame is provided in sections including a center section and respective left and right sections extending in opposite lateral directions from the center section, wherein the left and right sections are individually pivotably supported relative to the center section.

16. The harvesting head of claim 15, wherein the left and right sections are supported by a passive resilient floatation system with respect to the center section.

* * * * *